(12) United States Patent
Herr et al.

(10) Patent No.: US 8,292,680 B1
(45) Date of Patent: Oct. 23, 2012

(54) EXTERNAL BRASS SEAL FOR THE LRU-16/P LIFE RAFT

(75) Inventors: Michael D. Herr, Ridgecrest, CA (US); Jack L. Ingle, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 12/843,257

(22) Filed: Jul. 26, 2010

(51) Int. Cl.
*B63B 35/58* (2006.01)
*F16L 15/00* (2006.01)

(52) U.S. Cl. ........ 441/41; 285/143.1; 285/355; 285/392

(58) Field of Classification Search .................. 285/355, 285/392, 143.1, 393; 441/41, 99
See application file for complete search history.

(56) References Cited

U.S. PATENT DOCUMENTS

| | | | | | |
|---|---|---|---|---|---|
| 1,264,736 | A | * | 4/1918 | Wilson | 285/281 |
| 1,753,098 | A | * | 4/1930 | Tatarek | 285/206 |
| 2,694,022 | A | * | 11/1954 | Schreiner | 134/24 |
| 3,074,748 | A | * | 1/1963 | Ulrich | 285/347 |
| 3,104,120 | A | * | 9/1963 | Ahlport et al. | 285/154.1 |
| 3,491,783 | A | * | 1/1970 | Linsalato | 137/68.13 |
| 3,624,812 | A | * | 11/1971 | Rosan et al. | 285/151.1 |
| 4,959,034 | A | * | 9/1990 | Wass | 441/41 |
| 5,529,098 | A | * | 6/1996 | Bravo | 141/88 |
| 6,367,844 | B1 | * | 4/2002 | Smeltzer et al. | 285/95 |
| 6,883,836 | B2 | * | 4/2005 | Breay et al. | 285/189 |
| 7,909,366 | B1 | * | 3/2011 | Hall | 285/205 |

* cited by examiner

*Primary Examiner* — James Hewitt
(74) *Attorney, Agent, or Firm* — James M. Saunders

(57) ABSTRACT

An external brass seal for a floatation device includes a body having an upper portion, a lower portion, at least one aperture, and a seal. The aperture extends through the body and is adapted to transfer fluid into the upper portion and out of the lower portion.

7 Claims, 2 Drawing Sheets

EXTERNAL BRASS SEAL FOR THE LRU-16/P LIFE RAFT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to seals, and more particularly, external brass seals for floatation devices.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to seals, and more particularly, to external brass seals for floatation devices. LRU-16/P is a military designation of a life raft unit.

Seals are used in a variety of applications in both civilian and military matters. Nuts or threaded locking rings are used to connect shanks through rigid material to provide a secure passage through that material. Typically, the purpose is limited to securing the shank firmly in place. No consideration is given to allowing for passage of air or other gases through the nut or to protecting the underlying material. Additionally, life raft leakage failures have occurred during testing around a raft inflation valve where a carbon dioxide inflation bottle (an external air supply) is attached. Because of this, it is desirous to find an external brass seal for a floatation device.

The external seal effectively reduces or eliminates the leakage from the valve area. The external seal is in the form of a brass nut that is applied to the life raft inflation valve. The external air supply is commonly referred to as an inflator in the art of life rafts and other personnel life support equipment and survival gear. Once the external seal is applied to the life raft it becomes the interface for the inflator. A flow path is provided in the external seal for the flow of carbon dioxide during inflation.

Figure 1:
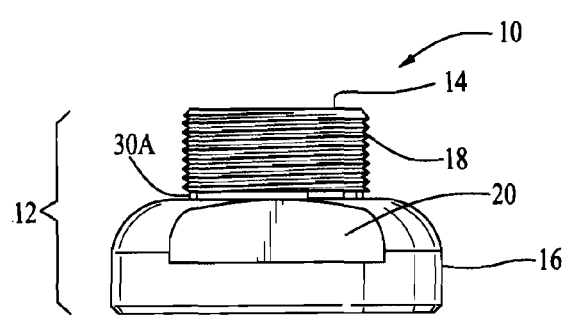
FIG. 1 illustrates an elevation view of an external brass seal for the LRU-16/P life raft, according to embodiments of the invention.

Referring to the accompanying drawings in which like reference numbers indicate like elements, FIG. 1 illustrates a first aspect of an external brass seal for the LRU-16/P Life Raft. Reference character 10 generally indicates an apparatus of embodiments of the invention.

As depicted in FIG. 1, the apparatus 10 is a body 12. The body 12 is a machined brass nut with an upper portion 14 and a lower portion 16 and is used as a connector to connect a life raft inflation valve with an external air supply. Alternative metals or metal-alloys may be used for the body 12. However, brass is selected in an embodiment because the life raft inflation and external air supply valves are brass. Using dissimilar metals together would cause increased structural failure amongst members and lead to increased corrosion in water. Similarly, brass corrodes more slowly than other metals. Furthermore, brass is a relatively easy metal to machine.

The upper portion 14 has threads 18 that are adapted to threadingly associate with threads on the external air supply. The lower portion 16 includes at least one fastening feature 20 in the lower portion and is adapted to allow grasping and axial rotation of the body 12 about a longitudinal axis. Additionally, the body 12 has rounded edges to prevent tearing of fabrics or other materials. This allows safe keeping because the apparatus 10 is stored with life rafts and other personnel support equipment and survival gear.

Figure 2:
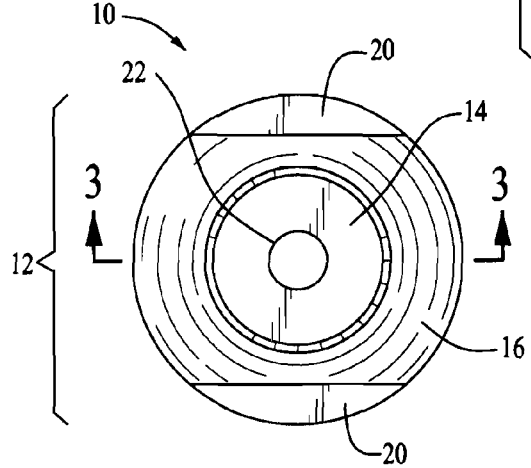
FIG. 2 illustrates a plan view of an external brass seal for the LRU-16/P life raft, according to embodiments of the invention.

In an embodiment shown in FIG. 2, the apparatus 10 includes at least one aperture 22. The apparatus 10 may be used to transfer any type of fluid (gas or liquid). The body 12 also includes a seal 24 (shown in FIG. 5). The apparatus 10 serves as a primary seal when it is actuated by rotating it about a longitudinal axis by grasping the fastening feature. When actuated by rotation, a barrier is formed between the lower portion 16 and the life raft valve. The barrier formed is the primary seal.

Figure 3:
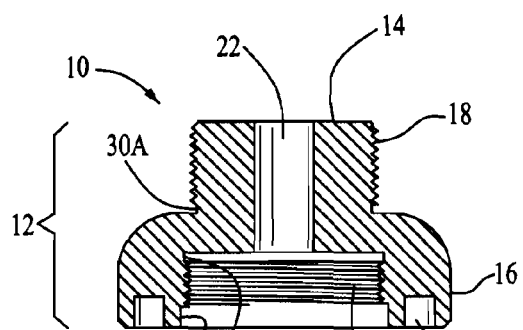
FIG. 3 illustrates a section view of an external brass seal for the LRU-16/P life raft, according to embodiments of the invention.

FIG. 3 shows a cross-section view of the apparatus 10. The aperture 22 extends through the entire body 12 and is adapted to transfer fluid into the upper portion 14 and out of the lower portion 16. The fluid in personnel support equipment and survival gear life rafts is carbon dioxide. The aperture 22 may partially include threads 26. Optionally, the aperture 22 has a larger diameter than the upper portion. The aperture threads 26 are internal in the aperture 22 and, in conjunction with the aperture's larger diameter it allows the apparatus 10 to threadingly associate with threads on the life raft inflation valve.

The lower portion 16 includes a circumferential groove 28. The groove 28 can be of any shape that compliments the shape of the seal 24 however, in an embodiment, the groove is a rectangular-shaped cut into the circumference of the lower portion 16 by machining techniques and is adapted to include the seal so that the seal is not substantially exposed to air, water, and other fluids. While the groove 28 is rectangular in cross-section in FIG. 3, other geometric cross-sectional shapes may also be used.

The lower portion 16 also includes machining notches 30A, 30B, and 30C (shown in FIGS. 1 and 3). Machining notches 30A and 30C are thread reliefs. Machining notch 30B is an undercut. Thread reliefs and undercuts are commonly used in machining practice to assist with assembling rotationally-applied connectors.

Figure 4:
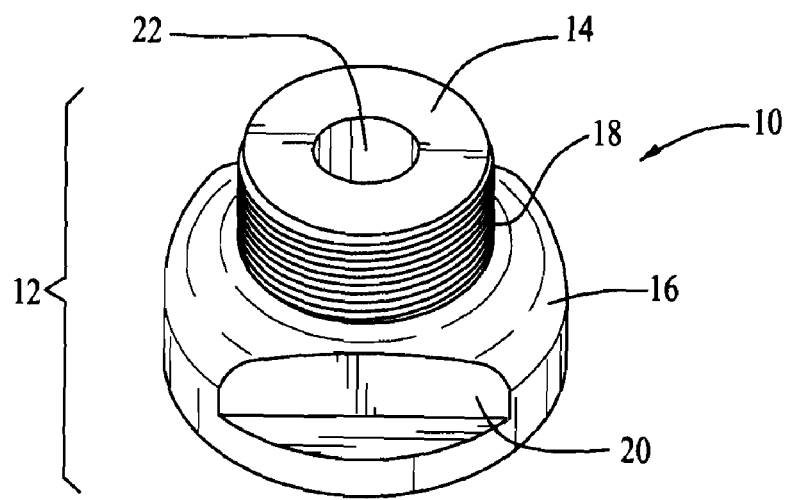
FIG. 4 illustrates an isometric top perspective view of an external brass seal for the LRU-16/P life raft, according to embodiments of the invention.

FIG. 4 depicts the apparatus 10 in an isometric top perspective view. The fastening feature 20 is shown to be a cutout in the lower portion 16. The fastening feature 20, however, may be any structure allowing the user, or a machine, to grasp the apparatus 10 and rotate it about a longitudinal axis. Thus, one skilled in the art will recognize that the invention can be used by an individual or mechanically, such as for example with a machine.

Figure 5:
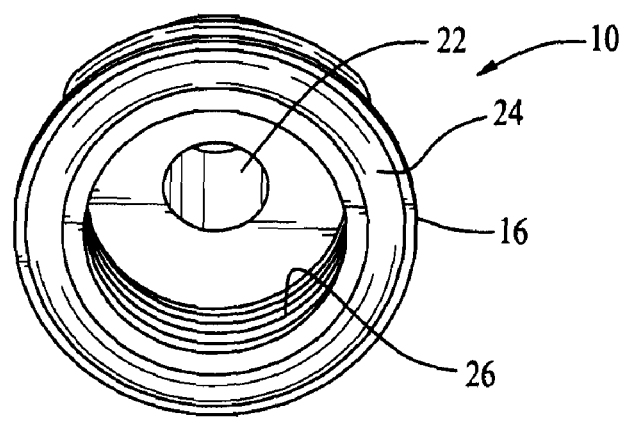
FIG. 5 illustrates an inverted isometric top perspective view of an external brass seal for the LRU-16/P life raft shown with an o-ring, according to embodiments of the invention.

FIG. 5 shows the apparatus 10 with the seal 24. The seal 24 is a deformable member that is friction fit in the circumferential groove 28 (shown in FIG. 3). As depicted in FIG. 5, the seal 24 is an o-ring that is appropriately dimensioned to friction fit in the circumferential groove 28 and maintain sealing engagement with the groove and the raft inflation valve. The o-ring 24 provides structural integrity between the lower portion 16 and life raft valve. Additionally, the o-ring 24 is a secondary seal between the lower portion 16 and the raft inflation valve.

The aperture threads 26 are shown and are appropriately dimensioned so that the lower portion 16 interfaces with the raft inflation valve. The raft inflation valve is a one-way valve that opens when gas passes from the lower portion 16, thus allowing the gas to pass into the life raft. As such, the apparatus 10 interfaces with the one-way valve. It should, however, be noted that the apparatus 10 can also be used with other types of valves, including two-way valves. Additionally, the apparatus 10 can be used with connection mechanisms where additional sealing is required due to observed leaks around connection interfaces.

The apparatus 10 is used when the life raft unit needs inflation. The apparatus 10 is connected to the life raft inflation valve by threading and rotating the lower portion 16 onto the life raft inflation valve. The lower portion 16 diameter matches the life raft inflation valve diameter. Additionally, the aperture threads 26 match the life raft inflation valve thread pitch, which allows for simple rotation of the body 12 onto the life raft inflation valve. The body 12 is grasped by the fastening feature 20, either by hand or using a tool, including a wrench, and rotated about the longitudinal axis defined by the life raft inflation valve until tightened. The amount of torque applied to connect the body 12 with the life raft inflation valve can be adjusted and varies depending on operational circumstances.

The external air supply (the inflator) is then connected to the apparatus 10. The inflator has an inflator connector. The inflator connector is threaded and rotated onto the upper portion 14 (shown in FIG. 4). The upper portion 14 diameter matches the inflator connector diameter. Additionally, the upper portion threads 18 (shown in FIG. 4) match the inflator connector thread pitch, which allows for simple rotation of the inflator connector onto the upper portion 14. The inflator connector is grasped either by hand or a tool and rotated about the longitudinal axis defined by the aperture 22 until tightened. The amount of torque applied to the inflator connector can be adjusted and varies depending on operational circumstances.

An inflator valve is opened, which passes fluid, carbon dioxide gas in the case of life rafts, into and out of the upper portion 14. The gas moves downward through the aperture 22, into and out of the lower portion 16, and then into the life raft inflation valve. The life raft inflation valve opens and gas passes through the life raft inflation valve and into the life raft. Operational circumstances dictate gas flow rate through the inflator, apparatus 10 and life raft inflation valve, as well as the appropriate inflation pressure of the life raft.

Major advantages of the invention include, but are not limited to, several aspects important to personnel support equipment and survival gear. The invention prevents leakage from occurring. The invention also allows for the passage of fluids including, air, other gases, and liquids through the nut. Additionally, the invention allows for the apparatus 10 to be stored with a life raft without tearing fabrics or flotation materials because external edges are round. Likewise, the o-ring 24 provides structural integrity and sealing between the lower portion 16 and the life raft inflation valve. These aspects are crucial when seconds count and lives are at stake.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. In a life raft inflation valve, an external brass seal, comprising:
   a brass nut having an upper portion, a lower portion, at least one aperture and, a circumferential groove in said lower portion, and deformable seal friction fit in said circumferential groove;
   wherein said lower portion has diametrically-opposed cutouts configured to allow hand grasping and axial rotation about a longitudinal axis;
   wherein said brass nut has rounded edges configured to prevent tearing of flotation materials;
   wherein said at least one aperture extends through said brass nut and is configured to transfer fluid into said upper portion and out of said lower portion; and
   wherein said deformable seal maintains sealing engagement with said groove and said life raft inflation valve.

2. In a life raft inflation valve, the external brass seal according to claim 1, wherein said deformable seal is not substantially exposed to air and water.

3. In a life raft inflation valve, the external brass seal according to claim 1, wherein said deformable seal is an o-ring.

4. In a life raft inflation valve, the external brass seal according to claim 1, wherein said upper portion is configured to threadingly associate with threads on an external air supply.

5. In a life raft inflation valve, the external brass seal according to claim 1, wherein said lower portion is configured to interface with said life raft inflation valve.

6. In a life raft inflation valve, the external brass seal according to claim 1, wherein said at least one aperture is configured to threadingly associate with threads on said life raft inflation valve.

7. In a life raft inflation valve, the external brass seal according to claim 1, wherein said fluid is carbon dioxide.

* * * * *